United States Patent
Hantzschel et al.

(10) Patent No.: US 12,551,932 B2
(45) Date of Patent: Feb. 17, 2026

(54) PRESSURE WASHER WITH A MOVABLE CROSSBAR

(71) Applicant: BLACK & DECKER INC., New Britain, CT (US)

(72) Inventors: Conor Christopher Hantzschel, West Islip, NY (US); Joseph A. Beyer, Elkridge, MD (US); Samuel B. Eshelman, Fallston, MD (US); Ryan Wuerfl, Parkville, MD (US); Rebecca Ann Ports, Conowingo, MD (US); Evan Robert Bottom, Rockville, MD (US)

(73) Assignee: BLACK & DECKER INC., New Britain, CT (US)

( * ) Notice: Subject to any disclaimer, the term of this patent is extended or adjusted under 35 U.S.C. 154(b) by 415 days.

(21) Appl. No.: 18/117,953

(22) Filed: Mar. 6, 2023

(65) Prior Publication Data
US 2024/0299991 A1    Sep. 12, 2024

(51) Int. Cl.
| | |
|---|---|
| *B08B 3/02* | (2006.01) |
| *H01M 50/204* | (2021.01) |
| *H01M 50/24* | (2021.01) |
| *H01M 50/247* | (2021.01) |
| *H01M 50/271* | (2021.01) |

(52) U.S. Cl.
CPC ........... *B08B 3/026* (2013.01); *H01M 50/204* (2021.01); *H01M 50/24* (2021.01); *H01M 50/247* (2021.01); *H01M 50/271* (2021.01); *B08B 2203/0211* (2013.01);
(Continued)

(58) Field of Classification Search
CPC ..................................................... B08B 3/026
See application file for complete search history.

(56) References Cited

U.S. PATENT DOCUMENTS

| | | |
|---|---|---|
| 2005/0248150 A1 | 11/2005 | Gilpatrick et al. |
| 2018/0133729 A1 | 5/2018 | Masters |

(Continued)

FOREIGN PATENT DOCUMENTS

| | | | |
|---|---|---|---|
| CN | 215089617 U | * | 12/2021 |
| EP | 0813916 A2 | | 12/1997 |

(Continued)

OTHER PUBLICATIONS

Yu, He-song, Machine translation of CN 215089617U, May 2021 (Year: 2021).*

(Continued)

*Primary Examiner* — Jason Y Ko
(74) *Attorney, Agent, or Firm* — Mannava & Kang, P.C.

(57) ABSTRACT

According to examples, a pressure washer may include a main housing including an inlet, an outlet, and a pump to force liquid to enter the main housing through the inlet and to exit the main housing through the outlet. The pressure washer may also include a roll cage surrounding the main housing, in which the roll cage may include a pair of support bars, a crossbar movably mounted to the pair of support bars; and a latch mechanism to releasably secure the crossbar to at least one of the pair of support bars. The crossbar may be spaced from the main housing to form a storage space, in which the crossbar is movable between multiple positions to enable ready access to the storage space.

20 Claims, 9 Drawing Sheets

(52) U.S. Cl.
CPC . *B08B 2203/0223* (2013.01); *B08B 2203/027* (2013.01); *H01M 2220/30* (2013.01)

(56) References Cited

U.S. PATENT DOCUMENTS

2021/0170453 A1    6/2021    Kohler Fernandez et al.
2022/0339655 A1*  10/2022  Wuerfl .................. B05B 9/0861

FOREIGN PATENT DOCUMENTS

| IT | MI20120128 A1 | 8/2013 |
| WO | 2022232100 A1 | 11/2022 |

OTHER PUBLICATIONS

"Partial European Search Report for EP Application No. EP24161879", mailed Jul. 10, 2024, 11 pages.

* cited by examiner

PRESSURE WASHER WITH A MOVABLE CROSSBAR

FIELD

The present disclosure is directed to pressure washers. The pressure washers include a roll cage having a movable crossbar that is spaced from a main housing of the pressure washer. The space between the main housing and the movable crossbar may form a storage space for one or more articles, such as hoses, cables, etc. The crossbar is movable to enable easier access to the articles in the storage space. The present disclosure is also directed to a pressure washer having a battery compartment within which battery packs are supported in a manner that is to reduce or minimize liquid ingress into the battery compartment.

BACKGROUND

Many types of pressure washers include pumps to increase the pressure of water expelled from the pressure washers. Pressure washers are thus often used to remove debris, dirt, mold, and other substances from various types of surfaces. The surfaces may include driveways, floors, patios, walkways, decks, home exteriors, etc. Pressure washers may also be used in cleaning motor vehicles, such as automobiles, boats, and the like. In many instances, the pressure washers are portable and are moved to various locations prior to and during their use.

SUMMARY

This section provides a general summary of the disclosure, and is not a comprehensive disclosure of its full scope or all of its features.

According to embodiments disclosed herein, a pressure washer may include a main housing and a roll cage surrounding the main housing. The main housing may include an inlet, an outlet, and a pump to force liquid to enter into the main housing through the inlet and to exit the main housing through the outlet. The roll cage may include a pair of support bars and a crossbar movably mounted to the pair of support bars. The roll cage may also include a latch mechanism to releasably secure the crossbar to at least one of the pair of support bars.

According to embodiments disclosed herein, a pressure washer may include a main housing, an inlet on the main housing, an outlet on the main housing, a pump to force liquid to exit the main housing through the outlet, a battery compartment positioned on a rear side of the main housing, the battery compartment having a top edge and side edges, in which the top edge is shorter in length than the side edges, and a battery compartment cover movable between a first position and a second position to selectively cover the battery compartment.

According to embodiments disclosed herein, a pressure washer may include a main housing, an inlet on the main housing, an outlet on the main housing, a pump to force liquid to exit the main housing through the outlet, and a battery compartment positioned on a rear side of the main housing, the battery compartment having a top edge and side edges, in which the top edge is shorter in length than the side edges. The pressure washer may also include a battery compartment cover movable between a first position and a second position to selectively cover the battery compartment. The pressure washer may further include a roll cage surrounding the main housing.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
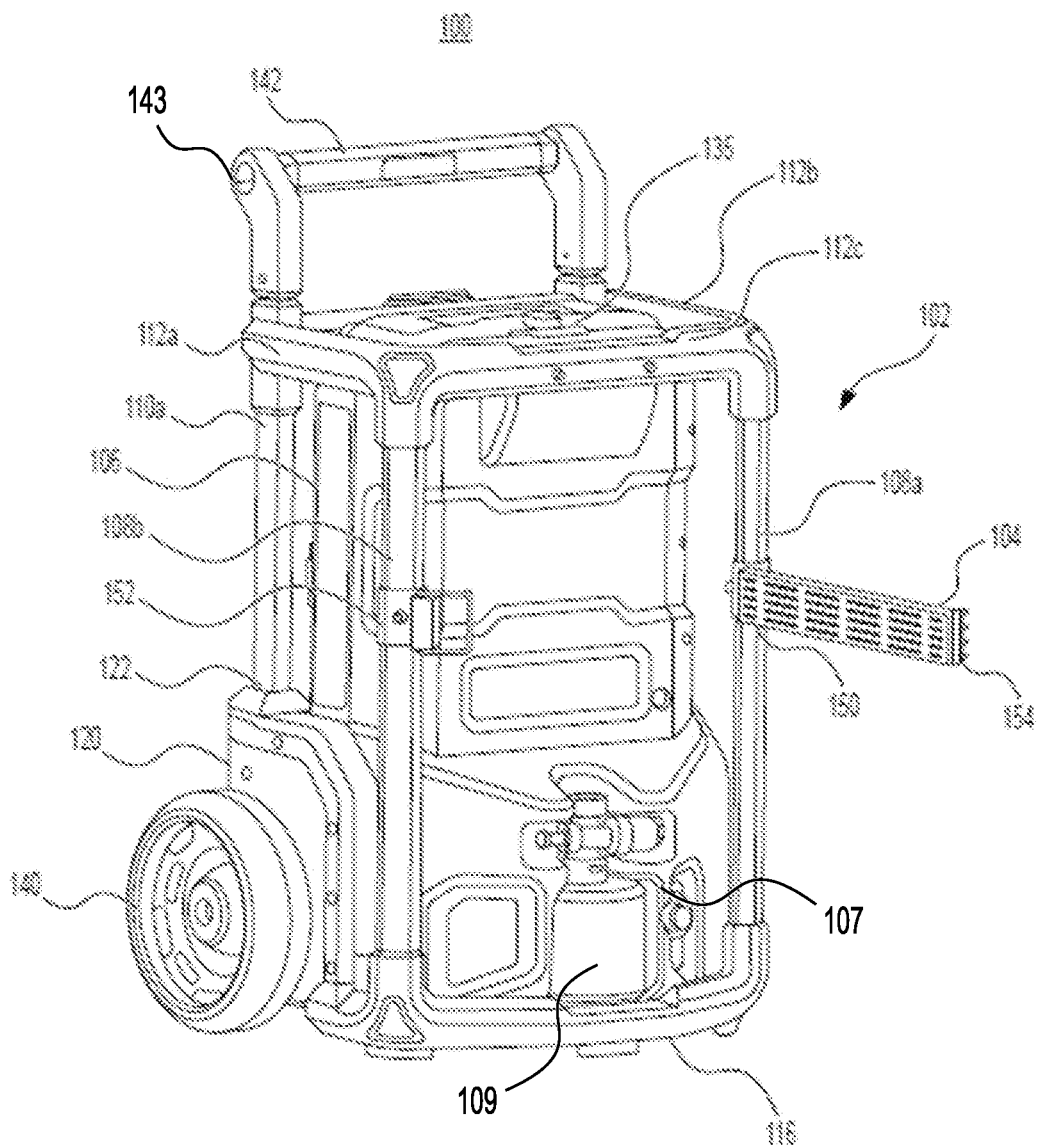
FIG. 1 shows a front perspective view of a pressure washer having a roll cage, which includes a movable crossbar, and a main housing, according to an embodiment of the present disclosure.

Pressure washers often include a number of accessories that are to be used with the pressure washers. The accessories may include, hoses that may be connected to the pressure washers to carry liquid into the pressure washers. The accessories may also include hoses that may be connected to the pressure washers to direct liquid out of the pressure washers. Users often drape the hoses on the pressure washers, which may make moving the pressure washers relatively more cumbersome.

Additionally, pressure washers that have rechargeable battery packs may include battery compartments that open on the tops of the pressure washers. In this regard, the battery packs may be positioned vertically within the pressure washers from the tops of the pressure washers. In these types of pressure washers, the battery compartments may have a relatively large area over which liquid may enter into the battery compartments. As a result, liquid may have a greater opportunity to enter into the battery compartments of these types of pressure washers. The entry of liquid, such as water, into battery compartments is undesirable as the liquid may damage the battery packs and/or the connections to the battery packs.

Disclosed herein are pressure washers that may include a storage space in which the accessories, such as hoses, may be stored. Particularly, the pressure washers disclosed herein may include a roll cage that surrounds a main housing of the pressure washers, in which the roll cage may include a crossbar movably mounted to a pair of support bars of the roll cage. The crossbar may be moved between a first position in which access to the storage space is inhibited and a second position in which access to the storage space is less inhibited. The crossbar may also include a latch mechanism to releasably secure the crossbar to at least one of the support bars. The crossbar may thus be movable between multiple positions to enable ready access to the accessories stored in the storage space. As a result, the accessories, such as hoses, may be contained within the storage space, which may make movement of the pressure washers relatively easier than when the accessories are draped onto the pressure washers.

The pressure washers disclosed herein may also include a battery compartment that is positioned at a rear section of the main housing such that at least one battery pack may be inserted horizontally into the battery compartment. The battery compartment may be shaped and arranged such that a top edge of the battery compartment is relatively smaller than the side edges of the battery compartment. Additionally, a gasket may be provided between a battery compartment cover and the battery compartment to inhibit entry of a liquid into the battery compartment, for instance, during use of the pressure washers.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 2:
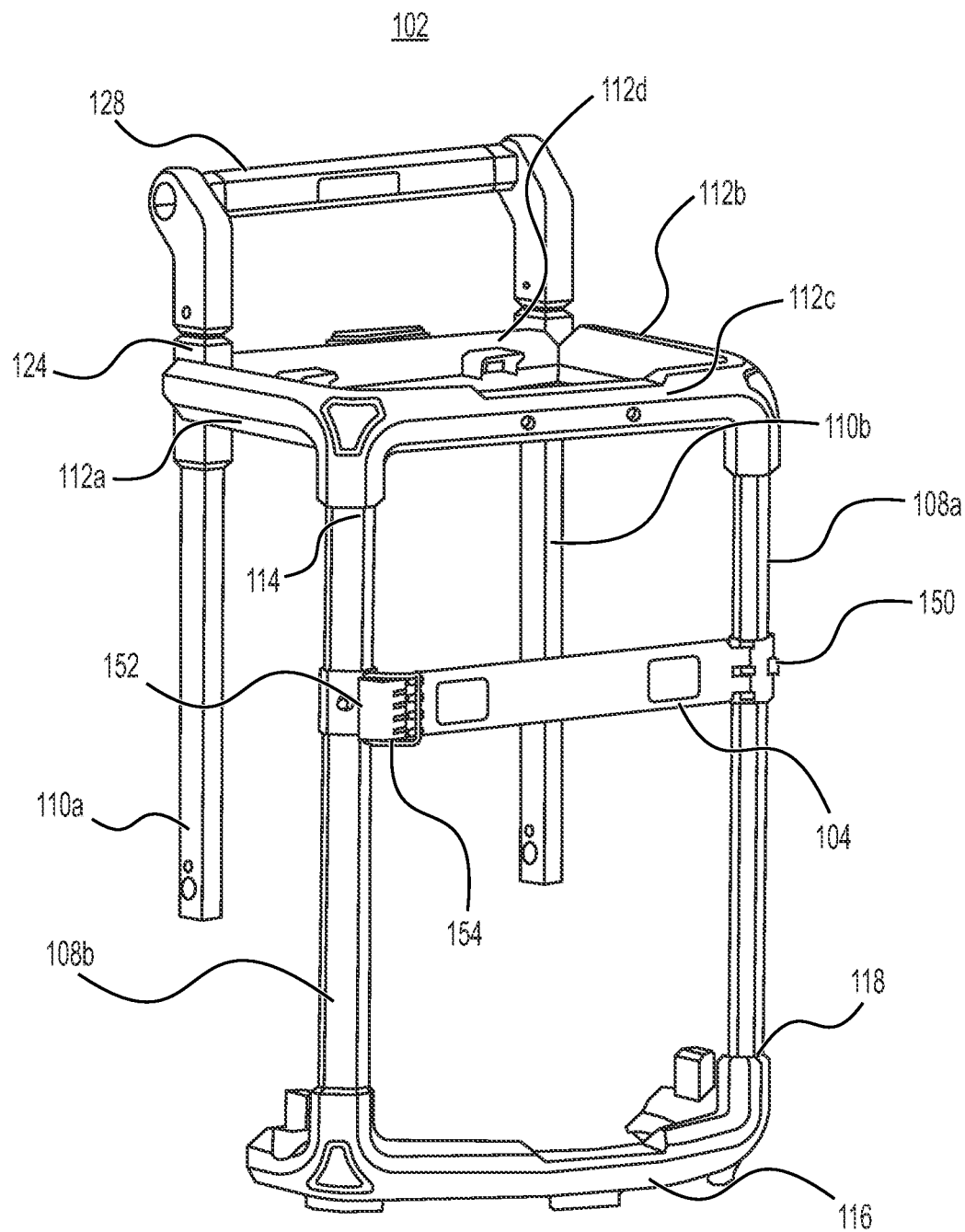
FIG. 2 shows a front perspective view of the roll cage depicted in FIG. 1, according to an embodiment of the present disclosure.

Reference is first made to FIGS. 1 and 2. FIG. 1 shows a front perspective view of a pressure washer 100 having a roll cage 102, which includes a movable crossbar 104, and a main housing 106, according to an embodiment of the present disclosure. FIG. 2 shows a front perspective view of the roll cage 102 depicted in FIG. 1, according to an embodiment of the present disclosure. It should be understood that the pressure washer 100 depicted in FIG. 1 and the roll cage 102 depicted in FIG. 2 may include additional components and that some of the components described herein may be removed and/or modified without departing from the scope of the pressure washer 100 or the roll cage 102 disclosed herein.

The roll cage 102, as shown in FIGS. 1 and 2, may include a plurality of support bars that are positioned around the main housing 106. Particularly, the roll cage 102 may include a first pair of support bars 108*a*, 108*b* that extend vertically in front of the main housing 106. The first pair of support bars 108*a*, 108*b* may support the crossbar 104 in a manner that may enable the crossbar 104 to be moved with respect to the main housing 106. Particularly, for instance, as shown in FIG. 1, the crossbar 104 may be rotated about one of the support bars 108*a*. In other examples, the crossbar 104 may be in slidable engagement with the support bars 108*a*, 108*b*, as discussed in greater detail herein.

The roll cage 102 may include a second set of support bars 110*a*, 110*b* that may extend vertically behind the main housing 106. Only one of the support bars 110*a* is visible in FIG. 1. The roll cage 102 may further include a third set of support bars 112*a*-112*d*. As shown in FIGS. 1 and 2, the support bars 112*a*-112*d* in the third set of support bars may be connected to each other at ends of the support bars 112*a*-112*d*. According to examples, the support bars 112*a*-112*d* may be integrated with each other such that, for instance, the support bars 112*a*-112*d* are formed as a single component. In other examples, the ends of the support bars 112*a*-112*d* may be connected to the ends of adjacent support bars 112*a*-112*d* through other connection mechanisms, such as mechanical fasteners, adhesives, welds, and/or the like.

The third set of support bars 112*a*-112*d* may include a plurality of openings 114 into which upper ends of the pairs of support bars 108*a*, 108*b*, 110*a*, 110*b* may be inserted. The upper ends of the support bars 108*a*, 108*b*, 110*a*, 110*b* may be connected to the third set of support bars 112*a*-112*d* through any suitable connection mechanism. For instance, the openings 114 in the third set of support bars 112*a*-112*d* may include a mating mechanism, such as a movable pin, and the upper ends of the support bars 108*a*, 108*b*, 110*a*, 110*b* may include holes into which the movable pins may be inserted. Alternatively, the upper ends of the support bars 108*a*, 108*b*, 110*a*, 110*b* may include a mating mechanism and the third set of support bars 112*a*-112*d* may include holes into which the mating mechanisms may be inserted. In other examples, the upper ends of the support bars 108*a*, 108*b*, 110*a*, 110*b* may be connected to the third set of support bars 112*a*-112*d* through use of other types of mechanical fasteners, adhesives, welds, and/or the like.

As also shown in FIGS. 1 and 2, the roll cage 102 may include a fourth support bar 116. The fourth support bar 116 may include openings 118 into which the bottom ends of the first pair of support bars 108*a*, 108*b* may be inserted. The bottom ends of the first pair of support bars 108*a*, 108*b* may be connected to the fourth support bar 116 in any suitable manner, such as the mechanisms discussed above with respect to the connections between the support bars 108*a*, 108*b*, 110*a*, 110*b* and the third set of support bars 112*a*-112*d*.

As shown in FIG. 1, the pressure washer 100 may also include base members 120 to which the second set of support bars 110*a*, 110*b* and the fourth support bar 116 may be connected. In some examples, the base members 120 may include openings 122 into which the second set of support bars 110*a*, 110*b* may be inserted. In addition, the second set of support bars 110*a*, 110*b* and the fourth support bar 116 may be connected to the base members 120 in any of the manners discussed herein with respect to the connections between the first and second sets of support bars 108*a*, 108*b*, 110*a*, 110*b* and the third set of support bars 112*a*-112*d*.

According to examples, the support bars 108*a*, 108*b*, 110*a*, 110*b*, 116 and the base members 120 may be formed of a relatively rigid material or a combination of materials, such as plastic, metal, an alloy, or the like. For instance, the first and second sets of support bars 108*a*, 108*b*, 110*a*, 110*b* may be formed of a first material and the third set of support bars 112*a*-112*d* and the fourth support bar 116 may be formed of a second material. The base members 120 may also be formed of the same or different materials as the support bars 108*a*, 108*b*, 110*a*, 110*b*, 116.

According to examples, the main housing 106 may include a recessed cavity 107 into which an accessory 109 of the pressure washer 100 may be held. For instance, the recessed cavity 107 may have a shape that is similar to the shape of the accessory 109 such that the accessory 109 may be form fitted into the recessed cavity 107. In some examples, the accessory 109 may be friction or snap fit into the recessed cavity 107. In other examples, the recessed cavity 107 may include a fastening device that may mechanically hold the accessory 109 within the recessed cavity 107 during movement of the pressure washer 100. By way of particular example, the accessory 109 may be an accessory that is to be attached to a wand during use of the pressure washer 100. In these examples, the accessory 109 may be a soap or detergent container, a foam cannon, or the like, that may enable a cleaning agent to be delivered through the wand during use.

Figure 3:
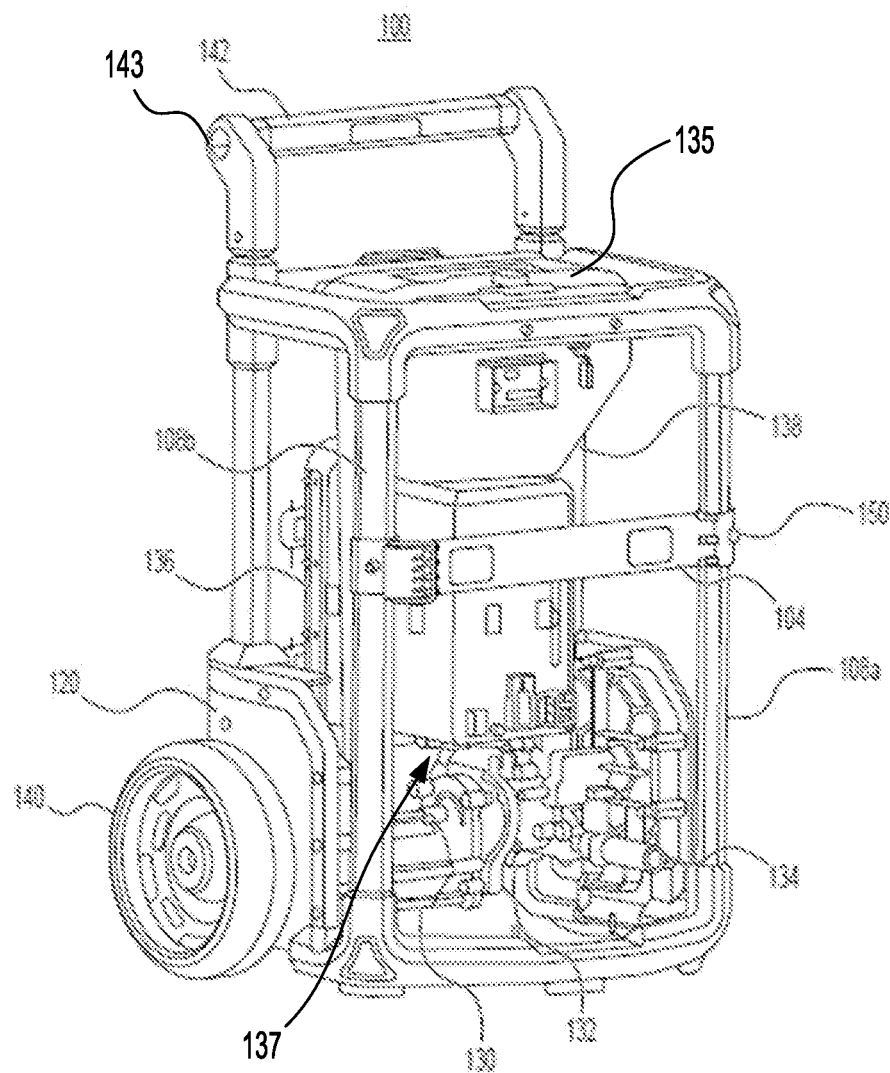
FIG. 3 shows a front perspective view of the pressure washer depicted in FIG. 1 with the main housing removed to enable the interior components of the pressure washer to be visible, according to an embodiment of the present disclosure.

Turning now to FIG. 3, there is shown a front perspective view of the pressure washer 100 depicted in FIG. 1 with the main housing 106 removed to enable the interior components of the pressure washer 100 to be visible, according to an embodiment of the present disclosure. As shown in FIG. 3, the pressure washer 100 may include working components housed within the main housing 106. The working components of the pressure washer 100 may include a motor 130 and a pump 132, among other components. The pressure washer 100 may also include an inlet (not shown in FIG. 1) into which a liquid, such as water, may flow into the pump 132 and an outlet 134 through which liquid from the pump 132 may be may be forced out of the pump 132. That is, the motor 130, when activated, may cause the pump 132 to apply pressure on the liquid to draw liquid into the pump 132 and force the liquid to be expelled through the outlet 134.

Figure 8:
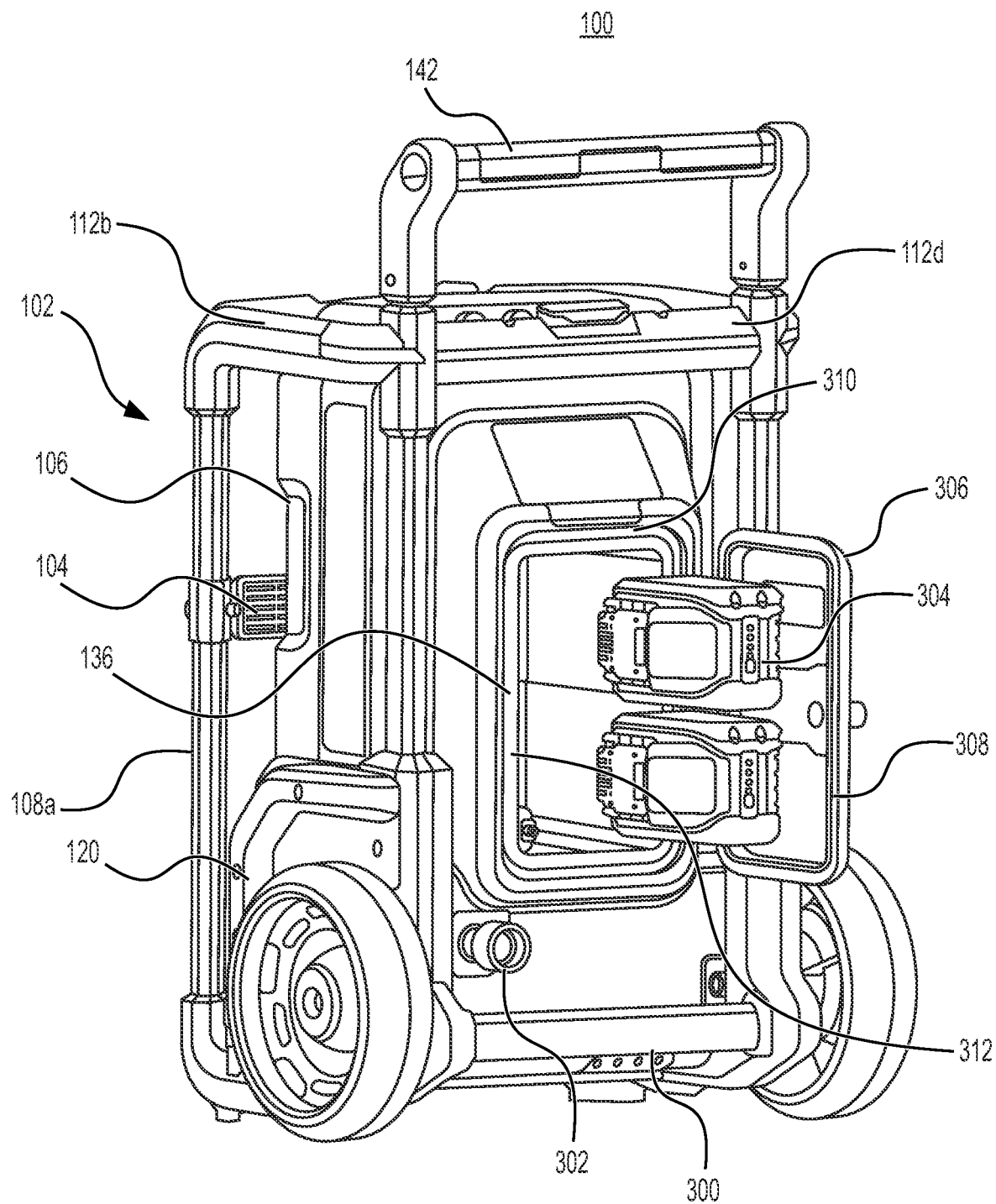
FIG. 8 shows a rear perspective view of the pressure washer depicted in FIG. 1, according to an embodiment of the present disclosure.
Figure 9:
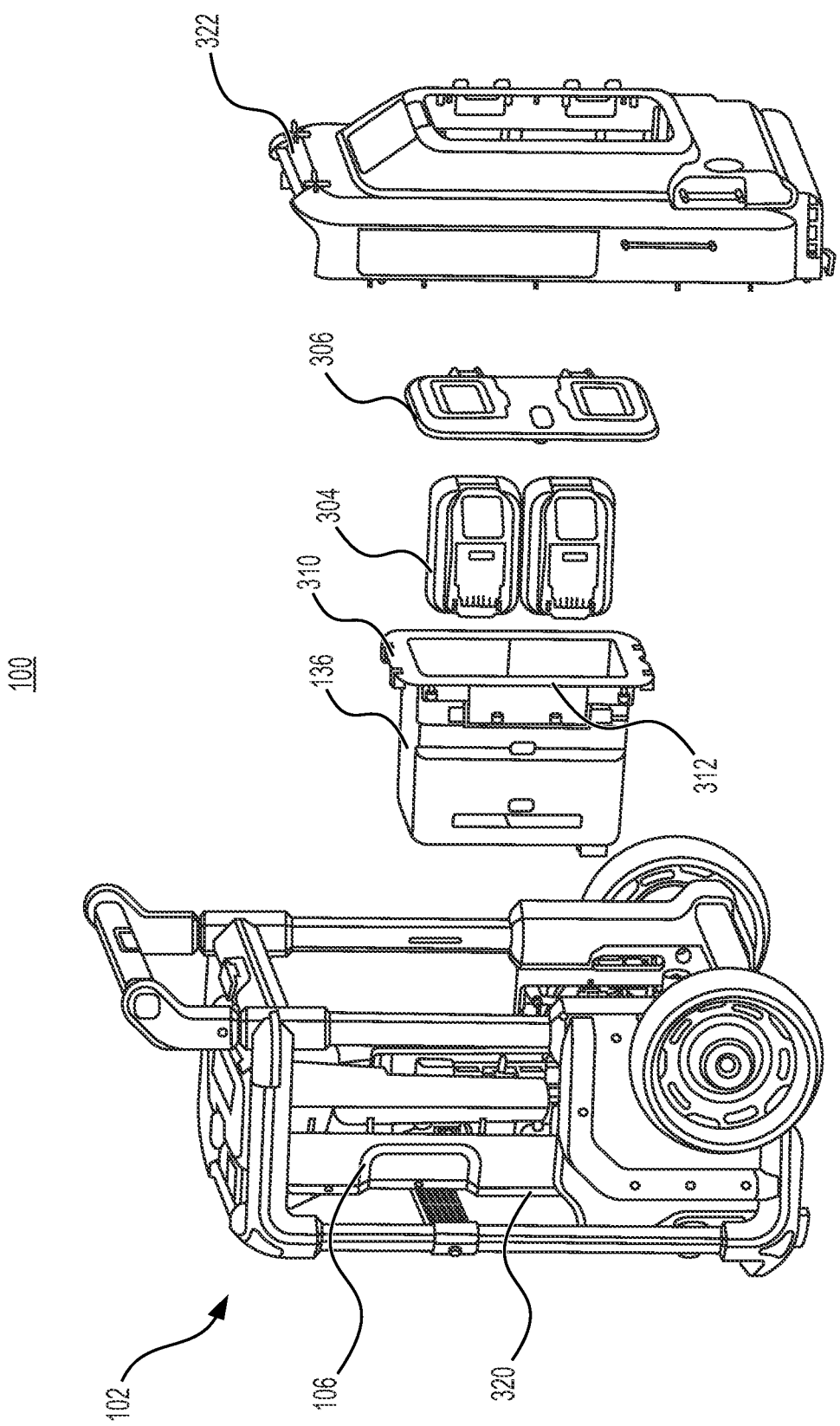
FIG. 9 shows a rear perspective, partially exploded, view of the pressure washer depicted in FIGS. 1 and 8, according to an embodiment of the present disclosure.

As also shown in FIG. 3, the interior of the main housing 106 may include a battery compartment 136 to hold at least one rechargeable battery pack (shown in FIGS. 8 and 9). The interior of the main housing 106 may also include an accessories compartment 138 to hold accessories of the pressure washer 100. The accessories may include a various wands, nozzles, etc., that may be connected to the outlet 134. According to examples, the pressure washer 100 may include a cover 135 that may be moved between an open position in which the accessories may be accessible and a closed position in which the accessories may be covered.

In FIG. 3, an approximate center of gravity of the pressure washer 100 when battery packs are inserted into the battery compartment 136 is identified by the arrow 137. According to examples, the center of gravity 137 may be found at a location that is beneath the battery compartment 136 and above the motor 130 and the pump 132. In other words, the motor 130 and the pump 132 may be positioned beneath the center of gravity 137 and the battery compartment 136 may be positioned above center of gravity 137. Additionally, the motor 130, the pump 132, and the battery compartment 136, along with the other components of the pressure washer 100 may be positioned with respect to each other such that the center of gravity 137 is located below the center of the pressure washer 100. As a result, the pressure washer 100 may be relatively stable and may resist being tipped over when in the upright position and during its use.

Figure 4:
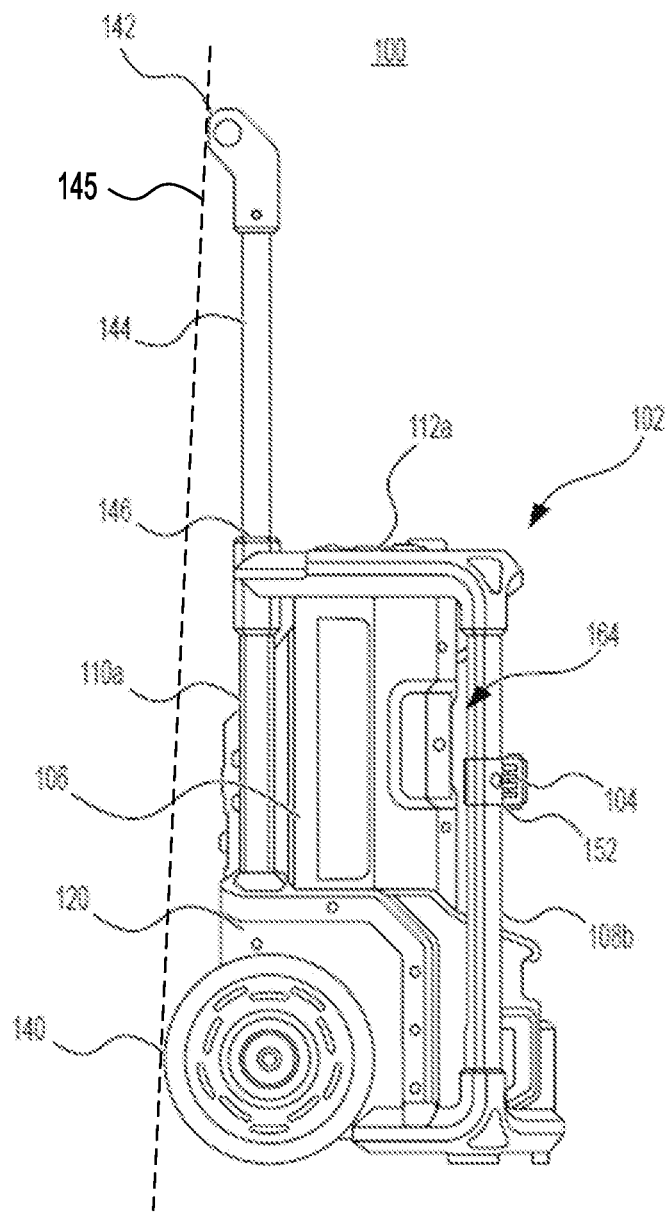
FIG. 4 shows a side elevation view of the pressure washer depicted in FIGS. 1-3, according to an embodiment of the present disclosure.

According to examples, and as shown in FIGS. 1 and 3, the pressure washer 100 may include a pair of wheels 140. The pressure washer 100 may also include a handle 142 that a user may grab to move or otherwise manipulate the pressure washer 100. In FIGS. 1-3, the handle 142 is shown as being in a retracted position. In FIG. 4, which shows a side elevation view of the pressure washer 100 depicted in FIGS. 1-3, according to an embodiment of the present disclosure, the handle 142 is shown in an extended position. Particularly, the pressure washer 100 may include legs 144 that are attached to the handle 142. In addition, the second set of support bars 110a, 110b may be hollow and the legs 144 may be inserted into the second pair of support bars 110a, 110b through openings 146 in the third set of support bars 112a-112d. That is, the second pair of support bars 110a, 110b may house the legs 144 when the handle 142 is in the retracted position. Although not shown, a release button may be provided on the handle 142 or other location on the pressure washer 100 to enable the handle 142 to be released from the retracted position.

According to examples, the handle 142 may include a first end 143 at or near the top of the handle 142 that is substantially aligned with the wheels 140, as denoted by the dashed line 145. That is, the first end 143 may substantially be aligned with the wheels 140 such that, when the first end 143 and the wheels 140 are placed on a horizontal surface, the support bars 108a, 108b, and thus, the pressure washer 100, are in a substantially horizontal position. For instance, the support bars 108a, 108b may be at an angle that is within about zero and about 5 degrees from horizontal.

Figure 5A:
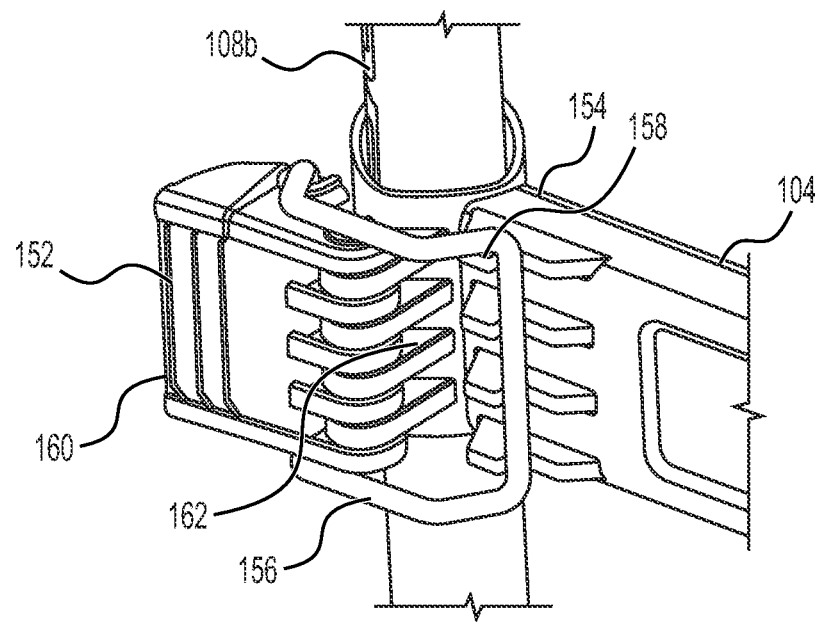
FIGS. 5A and 5B, respectively, show a front perspective view and a top view, partially in cross section, of the latch mechanism depicted in FIGS. 1-4, according to an embodiment of the present disclosure.
Figure 5B:
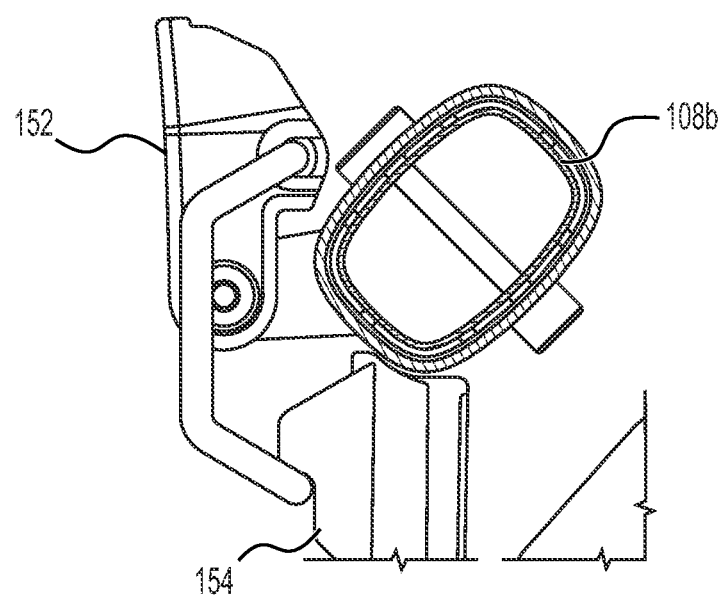

As discussed herein, the crossbar 104 may be movably mounted to the first pair of support bars 108a, 108b. Particularly, for instance, and as shown in FIGS. 1-4, a first end 150 of the crossbar 104 may be hingedly mounted to a first support bar 108a of the first pair of support bars 108a, 108b. In addition, a latch mechanism 152 to which a second end 154 of the crossbar 104 is to be releasably connected may be mounted to the second support bar 108b of the first pair of support bars 108a, 108b. Turning now to FIGS. 5A and 5B, there are respectively shown a front perspective view and a top view, partially in cross section, of the latch mechanism 152 depicted in FIGS. 1-4, according to an embodiment of the present disclosure.

In the example shown in FIGS. 5A and 5B, the latch mechanism 152 may include a latch 156 that is to engage teeth 158 at the second end 154 of the crossbar 104. The latch mechanism 152 may also include a lever portion 160 that may rotate about engagement members 162. Rotation of the lever portion 160 away from the crossbar 104 may draw the latch 156 into engagement with the teeth 158 at the second end 154 of the crossbar 104. The engagement between the latch 156 and the teeth 158 may apply pressure on the crossbar 104, thus preventing the crossbar 104 from unintentionally rotating away from the second support bar 108b. To disengage the crossbar 104 from the second support bar 108b, the lever 160 may be rotated away from the second support bar 108b, which may release the latch 156 from the teeth 158.

Although FIGS. 5A and 5B depict a particular type of latch mechanism 152, it should be understood that other suitable types of latch mechanisms may be employed to releasably secure the second end 154 of the crossbar 104 to the second support bar 108b without departing from a scope of the pressure washer 100 disclosed herein.

As shown in FIGS. 1 and 4, the crossbar 104 may be spaced from the main housing 106 to form a storage space 164 between a front surface of the main housing 106 and the crossbar 104, when the crossbar 104 is in a closed position as shown in FIG. 4. In addition, items stored in the storage space 164 may readily be accessible by opening the crossbar 104 as shown in FIG. 1. The items may include, for instance, one or more hoses (not shown), a charging cable, accessories for the pressure washer 100, and/or the like. Thus, for instance, a user may release the second end 154 of the crossbar 104 from the latch mechanism 152 to rotate the crossbar 104 away from the main housing 106 to make the storage space 164 more accessible. The user may position the one or more items in the storage space 164 and may rotate the second end 154 of the crossbar 104 toward the main housing 106 and may cause the latch mechanism 152 to releasably secure the second end 154 of the cross bar 104. The user may release the second end 154 from the latch mechanism 152 to access the one or more items stored in the storage space 164.

Figure 6A:
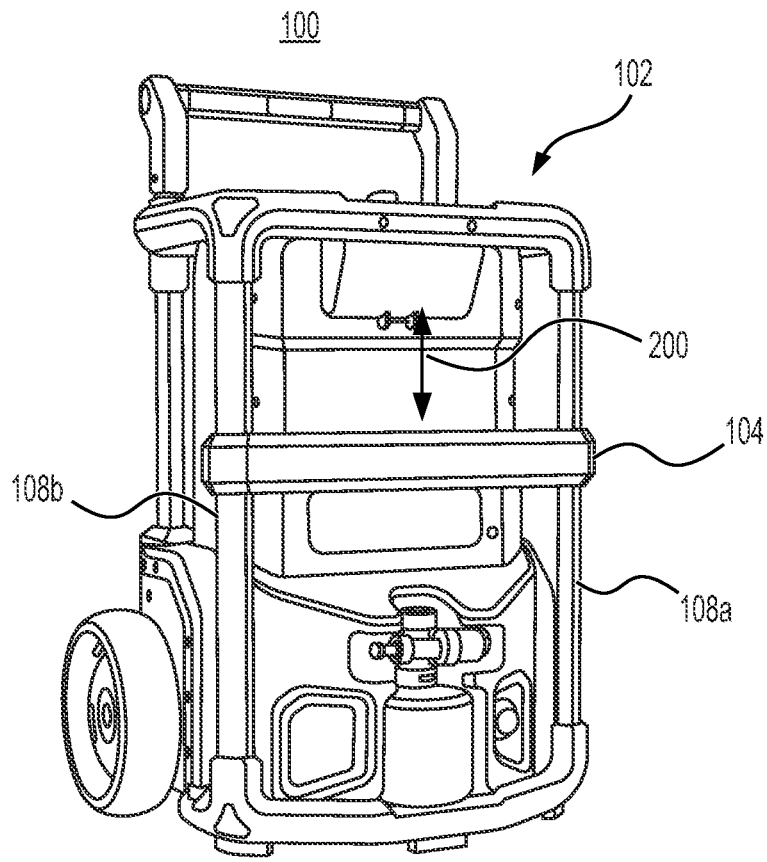
FIG. 6A depicts a front perspective view of a portion of the roll cage depicted in FIGS. 1-4, according to an embodiment of the present disclosure.

In other examples, the crossbar 104 may be movably mounted to the pair of support bars 108a, 108b in other manners. For instance, the crossbar 104 may be movably mounted on the pair of support bars 108a, 108b such that the crossbar 104 may move vertically with respect to the support bars 108a, 108b. An example of this type of arrangement is depicted in FIG. 6A, which depicts a front perspective view of a portion of the roll cage 102, according to an embodiment of the present disclosure. As shown in FIG. 6A, the crossbar 104 is movable vertically as denoted by the arrow 200. Particularly, the crossbar 104 may include openings through which the support bars 108a, 108b may extend and the crossbar 104 may be in slidable engagement with the support bars 108a, 108b. Thus, for instance, the crossbar 104 may be movable between a first position in which the crossbar 104 may block access to a portion of the storage space 164 and a second position in which the crossbar 104 may not block access to the portion of the storage space 164.

Figure 6B:
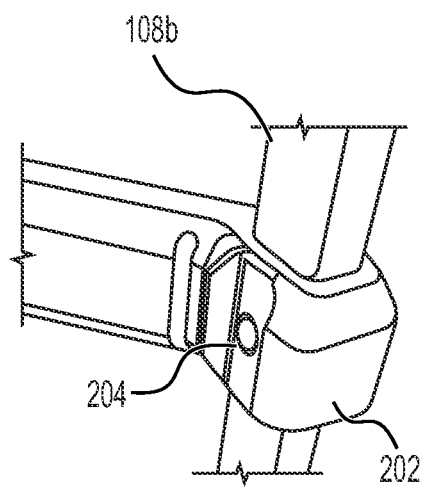
FIGS. 6B and 6C, respectively, depict perspective views of the latch mechanism 202, according to an embodiment of the present disclosure.
Figure 6C:
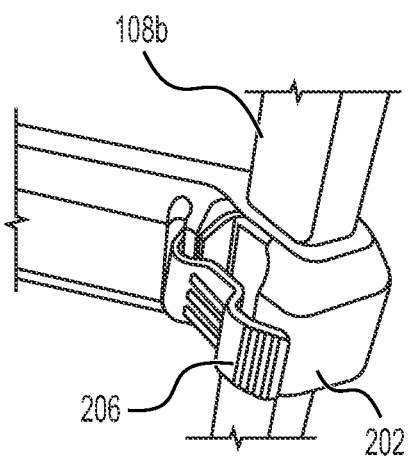

In some examples, the crossbar 104 may be held in either or both of the first position and the second position by a latch mechanism 202. An example of a latch mechanism 202 is depicted in FIGS. 6B and 6C. FIGS. 6B and 6C, respectively, depict perspective views of the latch mechanism 202, according to an embodiment of the present disclosure. In FIG. 6B, the latch mechanism 202 is depicted as including a spring detent pin 204 that may be inserted into a hole (not shown) of a plurality of holes in a support bar 108b. Pressure may be applied onto the spring detent pin 204 to release the latch mechanism 202 from the support bar 108b. For instance, the latch mechanism 202 may include a hinged paddle 206 that a user may press to apply pressure onto the spring detent pin 204 to release the latch mechanism 202.

Figure 7A:
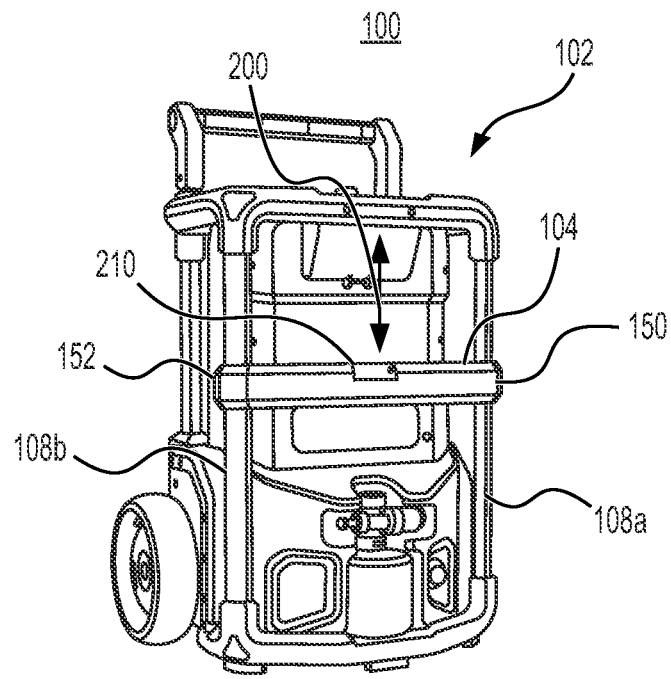
FIGS. 7A and 7B, respectively, show perspective views of portions of a roll cage having a crossbar that is in sliding engagement with support bars, according to an embodiment of the present disclosure.
Figure 7B:
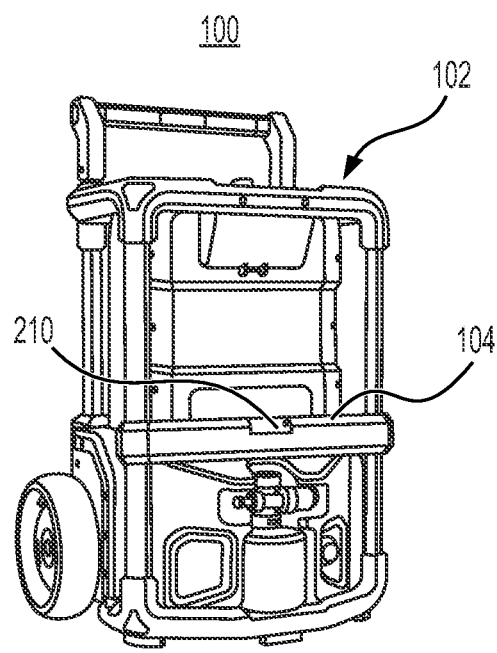

With reference now to FIGS. 7A and 7B, there are shown perspective views of portions of a roll cage 102 having a crossbar 104 that is in sliding engagement with support bars 108a, 108b, according to an embodiment of the present disclosure. Particularly, in the embodiment shown in FIGS. 7A and 7B, the crossbar 104 may be vertically movable with respect to the support bars 108a, 108b. In this regard, the first end 150 and the second end 154 of the crossbar 104 may including openings through which the support bars 108a, 108b may respectively be inserted. In addition, the support bars 108a, 108b may be in sliding engagement with the crossbar 104 via the openings.

Although not shown in FIG. 7A or 7B, the roll cage 102 may include engaging members that may releasably be inserted into holes in the support bars 108a, 108b or releasably engage teeth on the support bars 108a, 108b. The engaging members may be spring loaded such that the engaging members are biased outwardly toward the support bars 108a, 108b. In addition, the engaging members may be connected to a release button 210, which may be centrally positioned along the crossbar as shown in FIGS. 7A and 7B. That is, a user may press the release button 210 to release the engaging members from engagement with the support bars 108a, 108b. For instance, the pressing of the release button 210 may cause two cams connected to rods to rotate, in which the rotation of the cams may cause the rods to be pulled in from either side, which may release the engaging members from the support bars 108a, 108b. While in the released state, the crossbar 104 may be moved vertically as denoted by the arrow 200. The engaging members may releasably engage other portions of the support bars 108a, 108b to reposition the crossbar 104 with respect to the support bars 108a, 108b. Particularly, the crossbar 104 may be moved between a first position in which the crossbar 104 may block access to a portion of the storage space 164 and a second position in which the crossbar 104 may not block access to the portion of the storage space 164.

Reference is now made to FIG. 8, which shows a rear perspective view of the pressure washer 100 depicted in FIG. 1, according to an embodiment of the present disclosure. As shown in FIG. 8, the roll cage 102 may include a fifth support bar 300 that may be connected to the base members 120. The fifth support bar 300 may provide additional structural support to the roll cage 102 and may be formed of any of the materials discussed herein with the other support bars.

As also shown in FIG. 8, the main housing 106 may include an inlet 302 through which a liquid may be supplied into the pump 132 housed within the main housing 106. The inlet 302 may be connected to a hose through which the liquid may be supplied into the inlet 302 during use of the pressure washer 100.

The main housing 106 may also house the battery compartment 136, into which one or more battery packs 304 may be inserted. Although not shown, the interior of the battery compartment 136 may include connectors into which the battery packs 304 may be inserted and mounted. The main housing 106 may further include a battery compartment cover 306 that may be moved between an open position as shown in FIG. 8 and a closed position when the battery packs 304 are seated within the battery compartment 136. The battery compartment cover 306 may be hingedly connected to the battery compartment 136 or the main housing 106.

As shown in FIG. 8, the opening through which the battery packs 304 are inserted into the battery compartment 136 extends horizontally such that the battery compartment cover 306 extends vertically to cover the battery compartment 136. In addition, the battery compartment cover 306 is positioned on a rear side of the main housing 106 and the crossbar 104 is positioned on a front side of the main housing 106. In this regard, the battery compartment 136 may have a top edge 310 that is shorter in length than the side edges 312 of the battery compartment 136.

As also shown in FIG. 8, the battery packs 304 may be arranged in a vertically stacked arrangement with respect to each other. As a result, the battery packs 304 may have relatively large dimensions while enabling the battery compartment 136 to have a relatively small width. By reducing the width of the battery compartment 136, the amount of space through which liquid may enter into the battery compartment 136 through the top of the battery compartment 136 may be reduced or minimized. In addition, to further inhibit the ingress of liquid into the battery compartment 136, a gasket 308 may be provided around the battery compartment cover 306. That is, the gasket 308 may significantly seal gaps between the battery compartment 136 and the battery compartment cover 306 when the battery compartment cover 306 is in the closed position to inhibit ingress of liquid into the battery compartment 136.

Reference is now made to FIG. 9, which shows a rear perspective, partially exploded, view of the pressure washer 100, according to an embodiment of the present disclosure. As shown in FIG. 9, the main housing 106 may include a front section 320 and a rear section 322. The front section 320 and the rear section 322 may be connected to each other through use of any suitable connection mechanism, such as mechanical fasteners, welds, adhesives, and/or the like. In addition, the front section 320 and the rear section 322 may be formed of a relatively rigid material, such as plastic, metal, alloy, or a combination thereof.

The battery compartment 136 may be mounted to a component having connections onto which the battery packs 304 may be connected to provide electrical power to, for instance, the motor 130 and the pump 132. In addition, as discussed herein, the battery compartment 136 may have a rectangular shape, in which a top edge 310 of the battery compartment 136 may have a smaller length than a side edge 312 of the battery compartment 136. As discussed herein, the shape and positioning of the battery compartment 136 may reduce or minimize flow of liquid, such as water, into the battery compartment 136 during use of the pressure washer 100.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A pressure washer comprising:
   a main housing including:
      an inlet;
      an outlet; and
      a pump to force liquid to enter the main housing through the inlet and to exit the main housing through the outlet; and
   a roll cage surrounding the main housing, the roll cage having:
      a pair of support bars;
      a crossbar movably mounted to the pair of support bars; and
      a latch mechanism to releasably secure the crossbar to at least one of the pair of support bars.

2. The pressure washer of claim 1, wherein the crossbar is spaced from the main housing to form a storage space between the crossbar and the main housing and wherein the crossbar is movable between a first position in which access to the storage space is impeded by the crossbar and a second position in which access to the storage space is less impeded by the crossbar.

3. The pressure washer of claim 2, wherein the crossbar has a first end and a second end and wherein the first end is hingedly mounted to a first support bar of the pair of support bars and the latch mechanism releasably secures the second end to a second support bar of the pair of support bars.

4. The pressure washer of claim 2, wherein the crossbar has a first end and a second end, the first end being in slidable engagement with a first support bar of the pair of support bars and the second end being in slidable engagement with a second support bar of the pair of support bars.

5. The pressure washer of claim 4, wherein the latch mechanism is to releasably secure the first end of the crossbar to the first support bar.

6. The pressure washer of claim 4, wherein the latch mechanism is to releasably secure the first end of the crossbar to the first support bar and the second end of the crossbar to the second support bar.

7. The pressure washer of claim 1, further comprising:
   a battery compartment positioned within the main housing; and
   a battery compartment cover movable between an open position and a closed position, wherein the battery compartment cover is positioned on a rear side of the main housing and the outlet is positioned on a front side of the main housing.

8. The pressure washer of claim 7, wherein the battery compartment is configured to house multiple battery packs in a vertically stacked arrangement.

9. The pressure washer of claim 7, further comprising:
   a motor, wherein the motor and the pump are positioned below a center of gravity of the pressure washer and the battery compartment is positioned above the center of gravity of the pressure washer.

10. The pressure washer of claim 1, further comprising:
    an accessory, wherein the main housing includes a recessed cavity formed in a front side of the main housing, the recessed cavity having a shape that is similar to a shape of the accessory, and wherein the accessory is to be held within the recessed cavity.

11. The pressure washer of claim 1, further comprising:
    a handle having a first end at a top of the handle; and
    a pair of wheels rotatably mounted to the main housing, wherein the first end of the handle and the wheels are substantially aligned with respect to each other to cause the pressure washer to be in a substantially horizontal position when the pair of wheels and the first end of the handle are positioned on a horizontal surface.

12. A pressure washer comprising:
    a main housing;
    an inlet on the main housing;
    an outlet on the main housing;
    a pump to force liquid to exit the main housing through the outlet;
    a battery compartment positioned within the main housing; and
    a roll cage surrounding the main housing, wherein the roll cage includes:
       a pair of support bars;
       a crossbar movably mounted to the pair of support bars; and
       a latch mechanism to releasably secure the crossbar to at least one of the pair of support bars.

13. The pressure washer of claim 12, wherein the battery compartment houses a plurality of battery packs in a stacked arrangement with respect to each other.

14. The pressure washer of claim 12, further comprising:
    a battery compartment cover movable between a closed position and an open position to selectively cover the battery compartment; and
    a gasket positioned around the battery compartment cover to inhibit ingress of liquid into the battery compartment when the battery compartment cover is the closed position.

15. The pressure washer of claim 14, wherein the battery compartment is positioned in a rear of the main housing.

16. The pressure washer of claim 15, wherein the battery compartment cover is to hingedly move away from the rear of the main housing when the battery compartment cover is in the open position.

17. A pressure washer comprising:
    a main housing having a top, bottom, front and rear side;
    an inlet on the main housing through which liquid is suctioned into the main housing;

an outlet on the main housing;
a pump within the main housing to expel liquid from the main housing through the outlet;
a motor within the main housing to power the pump; and
a roll cage surrounding the main housing, wherein the roll cage comprises:
   a pair of support bars;
   a crossbar movably mounted to the pair of support bars; and
   a latch mechanism to releasably secure the crossbar to at least one of the pair of support bars.

18. The pressure washer of claim 17, further comprising:
at least a pair of wheels located at the bottom side of the main housing and a handle located at the top side of the main housing,
wherein the at least a pair of wheels and the handle are substantially aligned so that when the pressure washer is oriented horizontally, the roll cage defines a surface that is substantially flat.

19. The pressure washer of claim 17, further comprising:
a battery compartment positioned on the rear side of the main housing, the battery compartment to house at least one battery pack that is to supply power to the pump.

20. The pressure washer of claim 19, wherein the crossbar is spaced from the front side of the main housing to form a storage space between the crossbar and the main housing.

\* \* \* \* \*